(12) United States Patent
Holmes

(10) Patent No.: US 8,130,276 B2
(45) Date of Patent: Mar. 6, 2012

(54) PHOTOGRAPHY SYSTEM TO ORGANIZE DIGITAL PHOTOGRAPHS AND INFORMATION REGARDING THE SUBJECTS THEREIN

(75) Inventor: Jon A. Holmes, Eden Prairie, MN (US)

(73) Assignee: Lifetouch Inc., Eden Prairie, MN (US)

( * ) Notice: Subject to any disclaimer, the term of this patent is extended or adjusted under 35 U.S.C. 154(b) by 141 days.

(21) Appl. No.: 12/284,410

(22) Filed: Sep. 22, 2008

(65) Prior Publication Data

US 2009/0066810 A1 Mar. 12, 2009

Related U.S. Application Data

(63) Continuation of application No. 10/266,842, filed on Oct. 8, 2002, now Pat. No. 7,446,800.

(51) Int. Cl.
*H04N 5/225* (2006.01)
*H04N 5/76* (2006.01)
(52) U.S. Cl. .............. 348/207.99; 348/231.2; 348/231.6
(58) Field of Classification Search .................. None
See application file for complete search history.

(56) References Cited

U.S. PATENT DOCUMENTS

| | | | |
|---|---|---|---|
| 4,062,026 A | 12/1977 | Fujita | |
| 4,251,156 A | 2/1981 | Zimmermann et al. | |
| 4,269,495 A | 5/1981 | Dearing | |
| 4,330,186 A | 5/1982 | Hattori | |
| 4,422,745 A | 12/1983 | Hopson | |
| 4,664,491 A | 5/1987 | Kazumi et al. | |
| 4,668,984 A | 5/1987 | Rosenfeld | |
| 4,671,648 A | 6/1987 | Watanabe et al. | |
| 4,714,332 A | 12/1987 | Eguchi et al. | |
| 4,718,758 A | 1/1988 | Kawamura et al. | |
| 4,736,224 A | 4/1988 | Watanabe et al. | |
| 4,760,428 A | 7/1988 | Watanabe et al. | |
| 4,780,735 A | 10/1988 | Taniguchi et al. | |
| 4,814,802 A | 3/1989 | Ogawa | |
| 4,843,418 A | 6/1989 | Taniguchi et al. | |
| 4,854,696 A | 8/1989 | Guez | |
| 4,860,039 A | 8/1989 | Hata et al. | |
| 4,862,201 A | 8/1989 | Taniguchi et al. | |
| 4,864,229 A | 9/1989 | Lauks et al. | |
| 4,938,585 A | 7/1990 | Weiffenbach et al. | |
| 4,943,825 A | 7/1990 | Taniguchi et al. | |
| 4,963,917 A | 10/1990 | Taniguchi et al. | |
| 5,021,820 A | 6/1991 | Robison et al. | |
| 5,028,942 A | 7/1991 | Kirigaya | |
| 5,030,979 A | 7/1991 | Kobayashi et al. | |
| 5,060,006 A | 10/1991 | Taniguchi et al. | |
| 5,107,290 A | 4/1992 | Ohsawa | |
| 5,124,735 A | 6/1992 | Tsukahara et al. | |
| 5,128,519 A | 7/1992 | Tokuda | |
| 5,150,147 A | 9/1992 | Kobayshi et al. | |
| 5,179,266 A | 1/1993 | Imamura | |
| 5,181,060 A | 1/1993 | Kobayshi et al. | |
| 5,227,837 A | 7/1993 | Terashita | |
| 5,255,031 A | 10/1993 | Ikenoue | |
| 5,260,740 A | 11/1993 | Seto | |
| 5,274,408 A | 12/1993 | Fujisawa et al. | |

(Continued)

*Primary Examiner* — Justin P Misleh
(74) *Attorney, Agent, or Firm* — Merchant & Gould P.C.

(57) ABSTRACT

A photographic processing system to organize one or more digital photographs and information regarding the subjects being photographed. The system includes a camera to capture digital images of one or more subjects, a user input to receive data related to the one or more subjects who are being photographed, and a database to link the photographs with the data related to the respective subjects.

22 Claims, 16 Drawing Sheets

U.S. PATENT DOCUMENTS

| | | |
|---|---|---|
| 5,289,216 A | 2/1994 | Ohsawa et al. |
| 5,311,228 A | 5/1994 | Stoneham et al. |
| 5,369,463 A | 11/1994 | Terashita et al. |
| 5,371,561 A | 12/1994 | Sato et al. |
| 5,404,196 A | 4/1995 | Terashita et al. |
| 5,422,694 A | 6/1995 | Yoshida et al. |
| 5,471,266 A | 11/1995 | Satou |
| 5,479,226 A | 12/1995 | Kazami et al. |
| 5,525,459 A | 6/1996 | Peterson |
| 5,526,078 A | 6/1996 | Itoh et al. |
| 5,530,501 A | 6/1996 | Bell |
| 5,532,774 A | 7/1996 | Ootsuka |
| 5,555,047 A | 9/1996 | Tsuji et al. |
| 5,583,592 A | 12/1996 | Kato et al. |
| 5,614,969 A | 3/1997 | Izukawa |
| 5,617,162 A | 4/1997 | Kato et al. |
| 5,634,156 A | 5/1997 | Teremy et al. |
| 5,646,713 A | 7/1997 | Powers et al. |
| 5,649,247 A | 7/1997 | Itoh et al. |
| 5,664,248 A | 9/1997 | Naka et al. |
| 5,666,578 A | 9/1997 | Oikawa et al. |
| 5,701,530 A | 12/1997 | Fujino |
| 5,721,991 A | 2/1998 | Saito et al. |
| 5,729,777 A | 3/1998 | Saito et al. |
| 5,729,784 A | 3/1998 | Naka et al. |
| 5,734,941 A | 3/1998 | Teremy et al. |
| 5,740,484 A | 4/1998 | Miyazaki et al. |
| 5,745,811 A | 4/1998 | Okino et al. |
| 5,748,783 A | 5/1998 | Rhoads |
| 5,751,172 A | 5/1998 | Takano |
| 5,822,436 A | 10/1998 | Rhoads |
| 5,845,164 A | 12/1998 | Amano |
| 5,862,421 A | 1/1999 | Suzuki et al. |
| 5,895,135 A | 4/1999 | Funaki |
| 5,896,403 A | 4/1999 | Nagasaki et al. |
| 5,937,218 A | 8/1999 | Amano et al. |
| 5,946,444 A * | 8/1999 | Evans et al. .................. 386/200 |
| 5,963,513 A | 10/1999 | Lemelson |
| 5,974,267 A | 10/1999 | Motomura |
| 5,975,771 A | 11/1999 | Ogiwara |
| 5,991,550 A | 11/1999 | Sasagaki et al. |
| 5,995,768 A | 11/1999 | Kitagawa et al. |
| 6,018,633 A | 1/2000 | Miyamoto et al. |
| 6,038,408 A | 3/2000 | Constable |
| 6,052,536 A | 4/2000 | Arai et al. |
| 6,052,813 A | 4/2000 | Nagasaki et al. |
| 6,058,498 A | 5/2000 | Nagasaki et al. |
| 6,064,832 A | 5/2000 | Sato et al. |
| 6,151,456 A | 11/2000 | Saito et al. |
| 6,179,494 B1 | 1/2001 | Egawa |
| 6,181,880 B1 | 1/2001 | Ishihara et al. |
| 6,188,848 B1 | 2/2001 | Takahashi |
| 6,195,507 B1 | 2/2001 | Ito et al. |
| 6,205,296 B1 | 3/2001 | Hamada et al. |
| 6,249,397 B1 | 6/2001 | Sasaki |
| 6,256,084 B1 | 7/2001 | Saito et al. |
| 6,270,932 B2 | 8/2001 | Tatsumi et al. |
| 6,280,914 B1 | 8/2001 | Keech et al. |
| 6,321,040 B1 | 11/2001 | Wess et al. |
| 6,324,345 B1 | 11/2001 | Enomoto |
| 6,334,031 B1 | 12/2001 | Takahashi |
| 6,396,537 B1 * | 5/2002 | Squilla et al. .................. 348/239 |
| 6,608,563 B2 | 8/2003 | Weston et al. |
| 6,950,800 B1 | 9/2005 | McIntyre et al. |
| 7,148,917 B2 | 12/2006 | Klapman et al. |
| 7,193,742 B2 | 3/2007 | Grosso et al. |
| 7,251,048 B2 * | 7/2007 | Cheatle et al. .................. 358/1.15 |
| 7,430,003 B2 | 9/2008 | Nichols et al. |
| 7,446,800 B2 * | 11/2008 | Holmes .................. 348/207.99 |
| 7,583,291 B2 * | 9/2009 | Holmes .................. 348/207.1 |
| 7,714,908 B2 * | 5/2010 | Holmes .................. 348/231.3 |
| 2002/0051065 A1 | 5/2002 | Takahashi |
| 2002/0101519 A1 * | 8/2002 | Myers .................. 348/232 |
| 2003/0161009 A1 | 8/2003 | Yokoo et al. |

\* cited by examiner

PHOTOGRAPHY SYSTEM TO ORGANIZE DIGITAL PHOTOGRAPHS AND INFORMATION REGARDING THE SUBJECTS THEREIN

CROSS-REFERENCED TO RELATED APPLICATIONS

This application is a continuation application of U.S. application Ser. No. 10/266,842, filed Oct. 8, 2002, now U.S. Pat. No. 7,446,800, issued Nov. 8, 2008 and claims priority from that application which is also deemed incorporated by reference in its entirety in this application.

STATEMENT REGARDING FEDERALLY SPONSORED RESEARCH OR DEVELOPMENT

Not applicable.

BACKGROUND OF THE INVENTION

I. Field of the Invention

The present invention relates to a system for creating, editing, processing and printing photographs. More specifically, the present invention relates to equipment which allows a photographer to take pictures of a large number of subjects, link the pictures to data used in processing the pictures, edit the pictures and processing data, deliver the pictures and data to a lab which processes the photographs in a manner consistent with the data.

The system of the present invention is ideally suited for use by commercial photography businesses. The system of the present invention enables such businesses to efficiently photograph large numbers of subjects and process the photographs to provide quality prints of a desired size, composition and number to a customer.

II. Discussion of the Prior Art

The advent of modern automated processing systems for commercial photographers occurred in 1981. In that year, Talmadge Hopson completed his invention of a camera system that allowed a photographer to marry photographs to data related to the photographs. That camera system is described in U.S. Pat. No. 4,422,745 granted Dec. 27, 1983. That camera system, referred to in the trade as the Micro Z, has been used by Lifetouch National School Studios to efficiently produce and process school photographs since that time.

A significant advance in the art provided by the Micro Z was the ability to print a bar code on film adjacent to a photograph. This is shown in FIG. 13 of the Hopson patent. Data is supplied to the camera either using a data card reader which reads customer order cards or a 16-key data entry keyboard shown in FIG. 1. The camera writes the data in bar code format on the film adjacent the photograph as the film advances. The data in the bar code can include information such as an operator (photographer) I.D., a class code signifying the classroom of students the subject is associated with, the date the picture was taken, the roll and frame number of the film, and a package print selection which is used to tell the processing lab the size and number of prints to be created. The camera's controller is designed so that pictures cannot be taken unless all of the required data has been entered. This ensures that the processing plant will have this data for processing purposes. The Micro Z has been successfully used by Lifetouch National School Studios for 20 years to efficiently produce school photographs.

One disadvantage of recording data on film is that the data cannot be corrected even if it contains errors. The film serves as a "one-time programmable" memory. Another disadvantage is that since the data is written to the film as the film is advanced, the data must be entered into the camera before the film is advanced. Still other disadvantages exist, because the shutter is locked closed until the data is entered to ensure the data is properly matched to the photograph. Photographers simply cannot take a new picture until the data for the new picture is entered. Particularly when photographing young children, whose moods and expressions change rapidly, there is a real need to be able to take pictures first and enter data later.

The Micro Z camera disclosed in the Hopson patent was developed in an era when microprocessor technology was in its infancy and memory was very costly. With improved technology in these two areas, film cameras can be improved to overcome many of the disadvantages discussed above and to expand the amount of data available for use in processing the film. With the advent of high quality digital cameras, even further advantages are available.

SUMMARY OF THE INVENTION

The present invention represents a significant improvement to the Hopson patent that can be implemented using either a film camera or a digital camera. The system of the present invention allows vast amounts of data and large numbers of photographs to be linked together and used to efficiently fill customer orders for photograph prints.

With either a film camera or a digital camera implementation of the invention, a link must be created between each photograph taken and the data relevant to that photograph. Once this link is created, a variety of data can be associated with the photograph. This includes subject specific information such as the names, addresses, phone numbers, school, grades and student identification numbers of those pictured. This also includes frame specific information such as a frame number and printing instructions for the lab related to the specific picture.

The data can also include order information indicating what products have been ordered by a customer and what frames should be used to fill the order. Where the picture includes a group of subjects, the data can also include information related to the group such as the name of the group shown, the name of the group's coach or advisor, and the names of the group members. Other data can also be included to give the photographer additional artistic control. This data can be used to instruct the lab to crop the photograph, to substitute a background, to add vignettes, to soften the focus or the like. The above discussion represents only some of the data that can be linked to the photograph to ensure proper and efficient processing of customer orders.

Other advantages arise from the use of the present invention as opposed to the system disclosed in Hopson. First, nearly all of the data can be created, saved or edited at any time. When Micro Z cameras are used, this must all occur before the data is printed to the film. Second, the present invention, when implemented using digital photography, allows the pictures to be immediately displayed so that the customer can have the benefit of viewing the frame in advance of making a purchasing decision. Additional pictures can be taken if none are deemed acceptable to the customer. All of this can be done without the inefficiencies associated with printing proofs and shipping them between the lab, the photographer and the customer. Third, with the present invention, the photographer can exercise real creative control by adjusting the composition of the photo using a variety of software features or through directions given to the lab via the data associated with the photograph.

These and other benefits will be more readily understood by reading the detailed description of the invention set forth below in view of the drawings provided herewith.

DETAILED DESCRIPTION OF THE PREFERRED EMBODIMENTS

Figure 1:
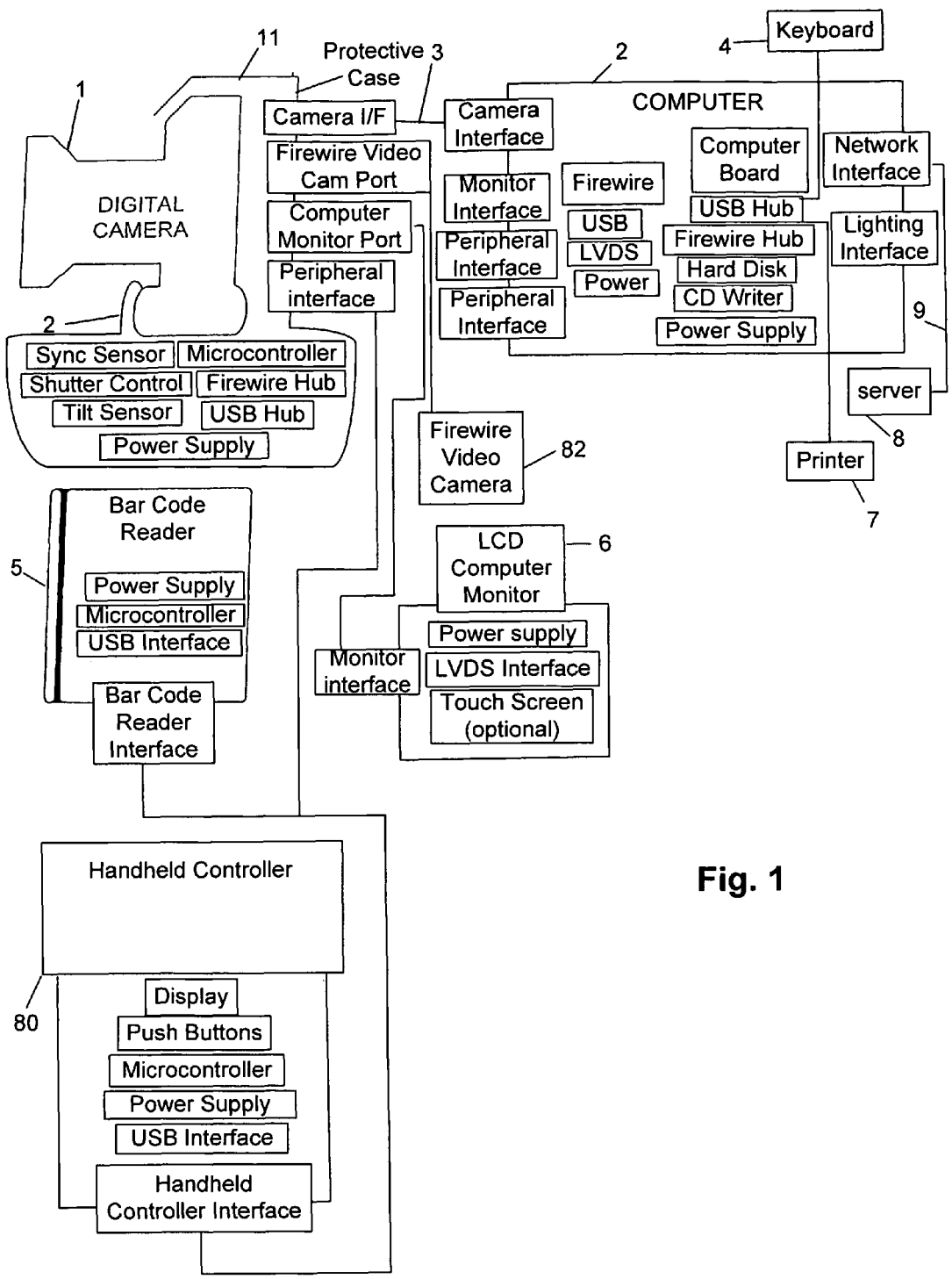
FIG. 1 is a block diagram of a preferred embodiment of the present invention.
Figure 2:
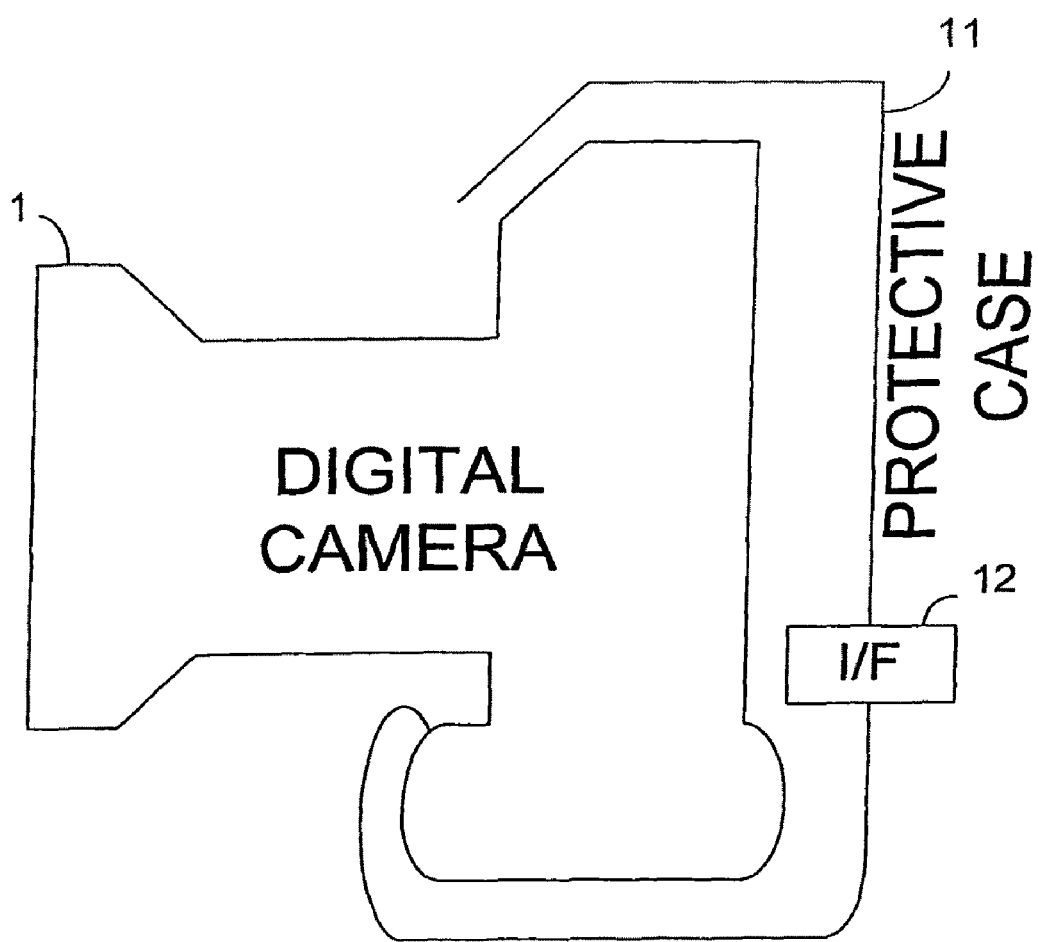
FIG. 2 is a block diagram of a camera and protective case.

As shown in FIG. 1, the system of the present invention includes a camera 1 and a computer 2 or 2'. The computer 2 can be self-contained within the housing of the camera 1. Alternatively, the camera 1 can be coupled to the computer using a RS232, USB, fire wire or any other data communications connection 3. Ideally, the camera is encapsulated in a protective case 11. Coupled to the computer 2 are a keyboard 4, a hand-held controller 80 and a card reader 5 for entering data, and a display 6 and printer 7 for viewing data. The printer 7 can also be used for on-site production of photographic prints. There must also be some mechanism for delivering data to a server 8 located, for example, in the processing lab. This can be done in any of a variety of ways. The computer 2 can connect to the server 8 in a wired or wireless fashion directly or over the Internet. Alternatively, the data can be delivered to the lab on a disk, tape or any other transportable media.

The principal function of the camera 1 is to capture images. The camera 1 can either be a film camera or a digital camera. When a film camera is used, the images are captured on a frame of film. When a digital camera is used, digital representations of the photographic images are captured in a digital frame file in the memory of the digital camera. A separate digital representation is captured each time a shutter actuator is actuated. Unless otherwise indicated, the term "frame" is used herein to indicate either a frame of film or a digital representation of an image which could be a file or any other block or collection of data containing a digital representation of the image. The term "shutter actuator" relates to any type of mechanism which triggers the capture of an image. This term is not limited to conventional shutters used on film cameras.

The computer 2 of the present invention serves a variety of functions. As will be discussed in further detail below, the computer 2 controls various operations of the camera 1. The computer is also used to collect and process data. Data is collected by the computer 2 in any number of ways. The keyboard 4 and card reader 5 can be sources of data. A data connection 9 with the server 8 can provide a source of data. Data can also be supplied to the computer on physical media in addition to cards read by the card reader 5 such as disks or tapes if the computer 2 is equipped with a suitable disk or tape drive. The camera 1 also supplies data to the computer 2. The data received from all of these sources is used to manage photographic processing. Data and digital photographs can also be viewed or printed using the display 6 and printer 7, respectively. A key feature of the present invention is the linking of data to the frames containing photographs. This feature is discussed in greater detail below.

FIGS. 2-5 are provided to show how an off-the-shelf digital camera 1, such as a Nikon Model DIX, can be combined with other equipment to achieve the benefits of the present invention. In the embodiment shown in these figures, the camera 1 is the fundamental image capture component in the system. The camera 1 is preferably physically encapsulated in a protective case 11 for three important reasons. First, off-the-shelf cameras are not as robust as is typically required for commercial use taking into account the large number of pictures taken in a commercial application. Second, the protective case 11 is designed so that a single connector 12 is used to connect the camera 1 to the computer 2, thus eliminating the need for multiple camera connections, each of which can be somewhat fragile. When the protective case 11 is provided, the various electrical inputs and outputs of the camera 1 are all wired to the single, field reliable connector 12 on the protective case 11. Third, because the camera will be controlled by the system's computer 2 rather than the buttons and knobs on the camera 1, the protective case 11 precludes access to certain buttons and knobs on the camera 1. For example, the case 11 can be designed so the photographer has access to the shutter button, but not to other controls on the camera 1 itself so that shutter speed, aperture, film speed or the like are all controlled by the system's computer 2. Also, additional switches and ports can be incorporated into the protective case 11. For example, a switch can be provided to indicate to the computer 2 whether housing is in the portrait or landscape (vertical or horizontal) position so this data can be automatically captured and recorded in a database. Also, such ports can be used to connect the separate hand-held computer controller 80, a separate video camera 82, or any number of other devices. (See FIG. 1).

Figure 3:
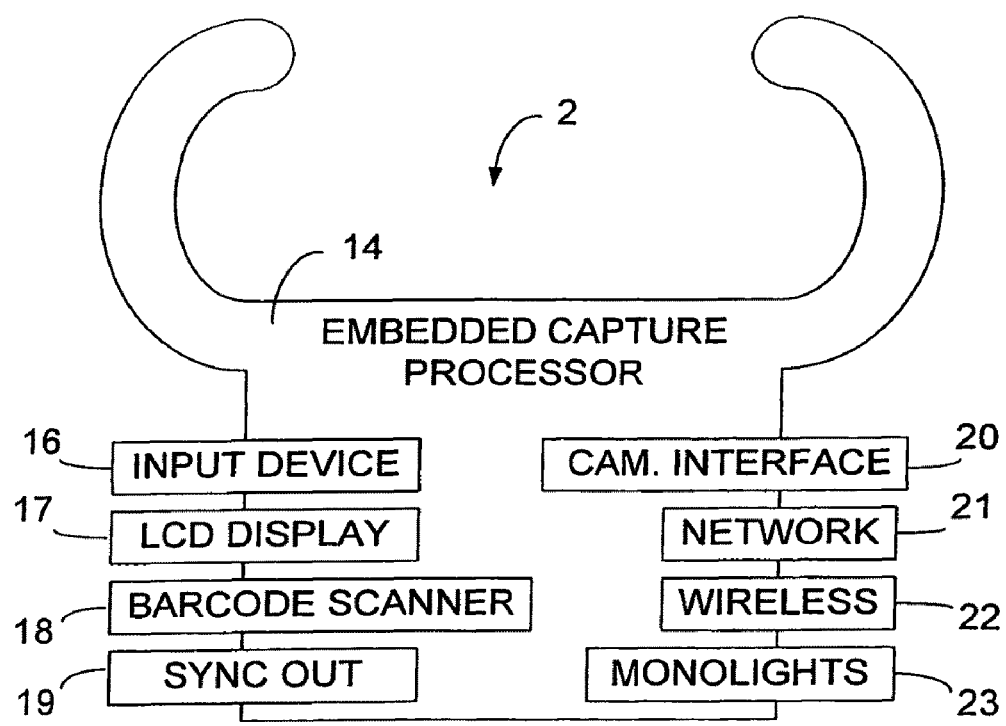
FIG. 3 is a block diagram of a computer that can be coupled to the camera of FIG. 2 to make the camera a network camera capable of use while practicing the present invention.
Figure 4:
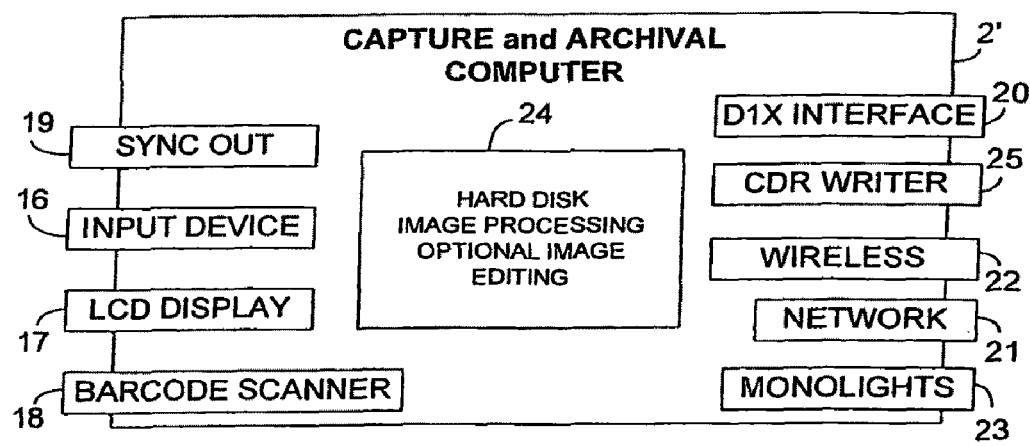
FIG. 4 is a block diagram of a computer that can be coupled to the camera of FIG. 2 to make the camera either a network or stand-alone camera capable of use while practicing the present invention.

FIGS. 3 and 4 show two different embodiments of the computer 2, one in which the camera 1 must be used as part of a network and another in which the camera 1 can either be networked or used on a stand-alone basis. The computer shown in FIG. 3 is intended to be networked. The computer comprises a capture processor 14, which is an embedded microprocessor-based computer packaged in a small form. The embedded capture processor 14 could, for example, be a Pentium processor package manufactured by Intel Corporation that uses an embedded Microsoft Windows operating system such as Embedded XP. Other software run by the processor 14 includes an interface to the camera 1; a user interface for data input, viewing, editing and the like; basic image processing to meet color balance, size and sharpness requirements of the commercial enterprise; and image transfer software for transferring images from the camera 1 to the computer 2 and from the computer 2 to other devices on a network.

The computer 2 shown in FIG. 3 must also be equipped with certain ports for coupling additional hardware to the computer 2. As shown, these ports include an input device port 16 to which a mouse and keyboard can be attached. A VGA/LCD display port 17 to which a suitable display can be attached, a serial port 18 to which the bar code reader can be attached, a sync out port 19 for radio slave operation, an interface 20 (such as a fire wire port) to which the camera 1 is attached, a network interface card 21 such as a 10/100 BaseT NIC for attaching the computer 2 to a network, a wireless network interface card 22 for making a wireless connection between the computer 2 and a network, and a jack 23 for controlling the actuation of lighting during photography. The computer 2 can also be equipped with additional serial ports, parallel ports, USB ports, fire wire ports, and power jacks so that additional equipment can be coupled to the computer 2.

The computer 2 shown in FIG. 3 is not intended to be used on a stand-alone basis so it is not equipped with either a hard drive or other disk drive for recording data or images. All data and images are intended to be stored on a server on the network to which the computer 2 is attached.

FIG. 4 shows an alternative embodiment of the computer which, when implemented, allows the camera to be used either on a networked or stand-alone basis. This version is ideally suited for situations where a network connection to the lab is not available at the site where the photographs are being taken. The computer 2' shown in FIG. 4 is very much like the computer 2 described above with reference to FIG. 3. There are two differences, however, First, the computer 2' shown in FIG. 4 includes a hard disk 24 and either a CD-R writer 25 or a DVD writer. The hard disk 24 is used to store the data of a database as well as images taken by the camera 1. The CD-R writer 25 or DVD writer can be used to store data and/or images on either CD-Rom or DVD media for transfer to the lab. Alternatively, the system can later be moved to a location where a network connection is available and either the 10/100 BaseT or wireless network cards 21 and 22 can be used to transfer data and images to the lab.

The computer 2' of FIG. 4 must also be equipped with certain additional software to function as a stand-alone system. This includes CD-Rom writing software and can also include proof printing software when there is a desire to produce on-site proofs of the pictures taken and a proof printer 7 (See. FIG. 1) is provided.

Figure 5:
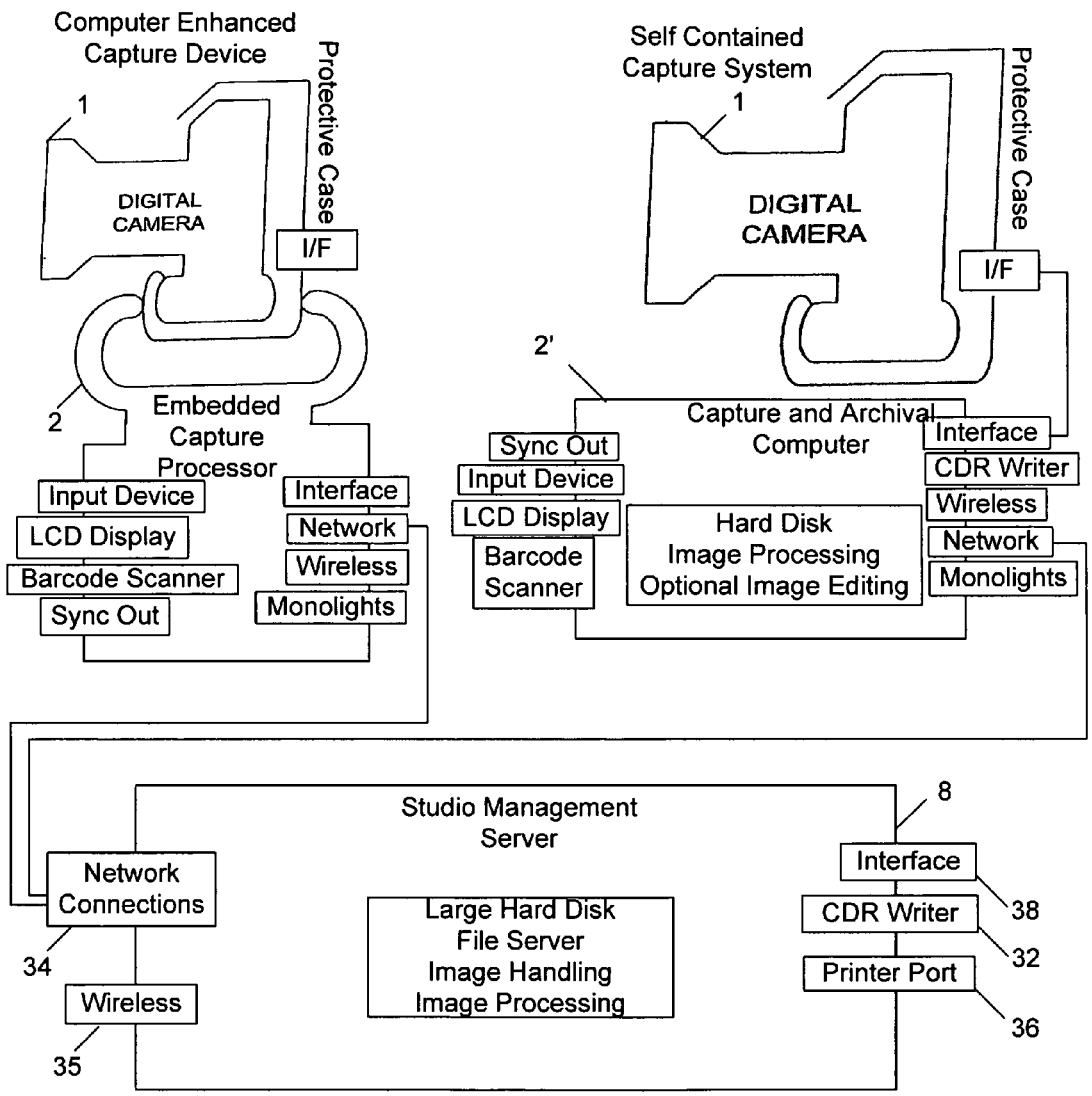
FIG. 5 is a block diagram showing how the computers of FIGS. 3 and 4 can be used in a networked environment to practice the present invention.

FIG. 5 is provided to show how either the computer 2 shown in FIG. 3 or the computer 2' shown in FIG. 4 can be used to connect cameras to a network to create a multiple camera capture system. In addition to a pair of cameras 1 and 1' which are respectively coupled to computers 2 and 2', FIG. 5 shows a server 8. The server 8 is essentially a file server with a large, hard disk. The file server stores image files and database data on the hard disk. Essentially any high performance file server running under a suitable operating system can be used. Preferably, the file server 8 will be equipped with a CD-R or DVD read/write drive 32 and multiple 10/100 BaseT and wireless network connections 34 and 35. Alternatively, a router or switch could be used to control traffic between the server 8 and computers 2 and 2' and other devices in the network. Either the drive 32 or network connections 34 or 35 can be used to transfer data and images between the computers 2 and 2' and the server 8. An uninterruptible power supply (not shown), printer ports 36 and fire wire ports 38 are also preferably provided. A fire wire port could, for example, be used to connect a camera 1 directly to the server 8.

In addition to the operating system, the server 8 should be equipped with other software. Such software includes image handling software, image processing software, database management software, proofing software, CD-R and DVD writing software, and the like. Such software is very much dictated by the functions to be performed.

The functions performed by the server 8 include saving data and images, processing of the images, processing of data, image storage, order processing, sales tracking, and controlling the printing of orders via printers attached to the printer ports.

To store data on the server 8 in a useful format, a database must be created. As used herein, "database" means any collection of data or information. Various types of databases can be used including a hierarchical database, a network database, or a relational database. The database can be present on the computer 2', on server 8 if a client/server model is used, or both. Ideally, much of the data will already be stored in the database before the photographic session begins. Of course, data can and usually will be added to the database either during or after the photographic session.

Figure 6:
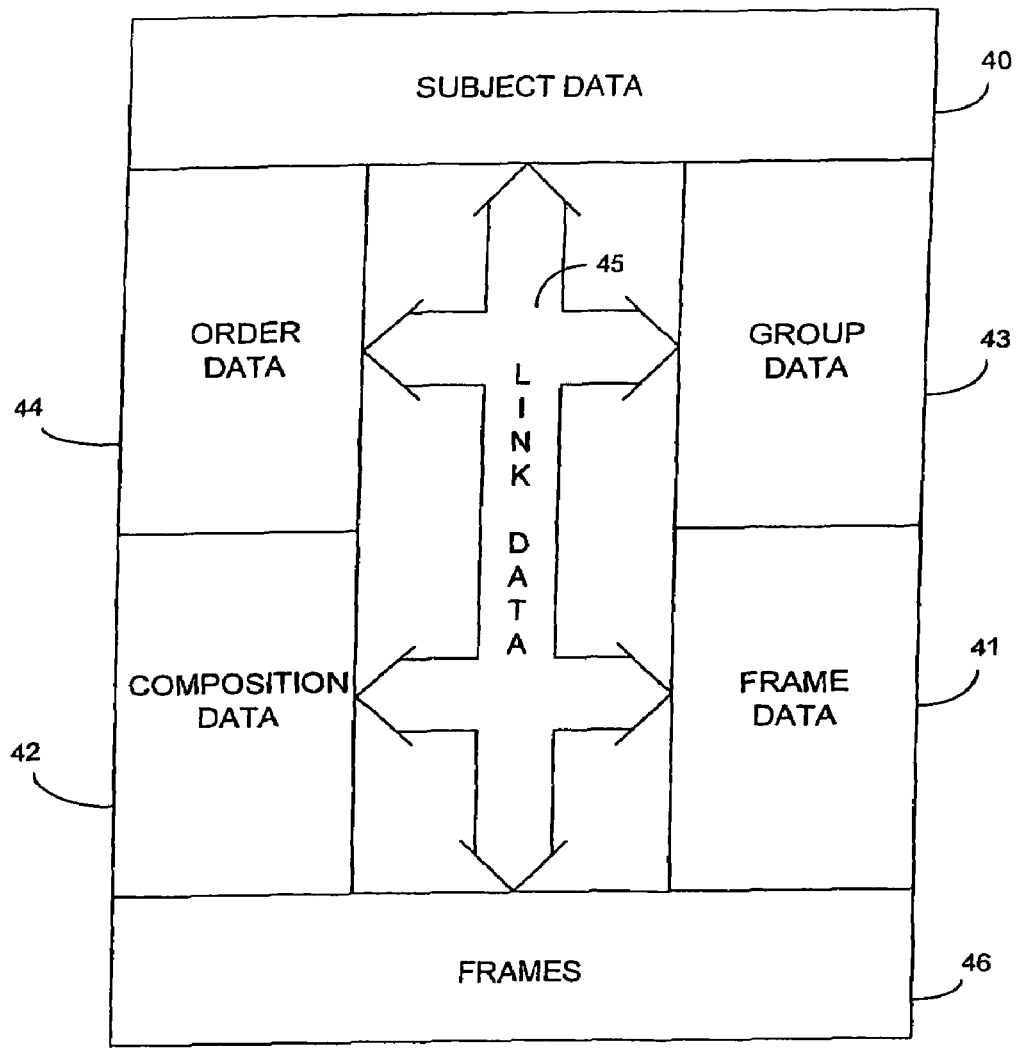
FIG. 6 is a diagram showing the manner in which data and photographic frames are collected and linked in a database.

To fully appreciate the advantages of the present invention, one needs to understand the different kinds of data that can be stored in this database and linked to each photograph frame. As shown in FIG. 6, this data generally falls into six groups—subject data 40, frame data 41, composition data 42, group data 43, order data 44, and link data 45. The frames 46 can also be considered data.

Subject data 40 is any data specifically related to the subject photographed. Such data can include the name of the subject, the address of the subject, the telephone number of the subject, the home address of the subject, the e-mail address of the subject, the school the subject attends, the class the subject is in, or any other data used to identify a subject such as a student identification number, driver's license number or social security number. The subject data will also include an identification code unique to the particular subject.

Frame data 41 can be defined as any data specifically related to a frame of film or a frame file in which the image is stored. This data can include a frame number assigned by the camera, an indication of whether the picture was taken in a portrait or landscape fashion, or data to be used by the lab for post-processing of the photographs.

A subset of frame data 41 is composition data 42. Composition data is used by the photographer to give instructions to the lab for post-processing of the photograph. Specifically, the photographer can supply data indicating how the picture should be corrected to address flows before printing. The photographer can instruct the lab to crop or zoom the image to correct positioning errors. The photographer can instruct the lab to perform exposure correction or color correction algorithms. The photographer can instruct the lab to substitute a new background, add vinettes, or apply a "soft focus" look. The photographer can also instruct the lab to otherwise touch up the photograph to mask skin blemishes. Composition data can also include data collected and stored in a manner with EXIF specifications. EXIF specifications relate to attaching metadata to digital pictures. Such data typically relates to forms and exposure settings used to take the picture. It does not include subject data.

Group data 43 needs to be associated with the photograph whenever the photograph is of a group of subjects. Any data specifically related to a group is group data. Group data can include the name of the group, the names of the members of the group, the names of the group's leaders, the organization or institution the group is affiliated with, or the like.

Still another kind of data used by the system is order data 44. This data is used by the lab to determine what products to create and what frame or frames to use in the creation of a product. Recently, various standards have emerged to permit printers to directly produce copies from the storage devices of digital cameras. Under these standards, some data is associated with the picture. Such data falls within the term "order data" as that term is used herein. Of course, storing such data in a manner consistent with such specification is fully consistent with the application of the present invention.

From the foregoing, those skilled in the art should recognize that various types of data can advantageously be collected for use in the lab. Those skilled in the art should also recognize that this data must be matched to the correct photographs. A mismatch of data will bring automated processing to a halt. Thus, the system of the present invention also creates and utilizes link data 45. In the most basic of situations, the database will include the name of the subject and an identification code unique to the subject. The unique identification code is entered into the camera system. When the photograph is taken, not only is the image created, but also the unique identification code is linked to the photograph. In the present invention, this is done automatically by creating link data which associates the frame (which can either be a frame of a roll of film or a set of data in which a digital representation of the image is stored) with the unique identification code of the subject. Digital images (i.e. frames) can be stored in individual image files or collectively in a database file. Link data includes any data used to link frames, frame data, subject data, group data, composition data or order data. Preferably, the link data is stored in the computer. The link data could also be stored in the camera (or on film) as part of the frame. The link data could be stored in both of these places or even other places as well.

It must also be recognized that data collecting and data linking or matching must be done in a fashion that does not interfere with the efficient taking of high quality pictures. Different techniques should be used to collect and match the data to ensure high quality photography in different situations.

Figure 7:
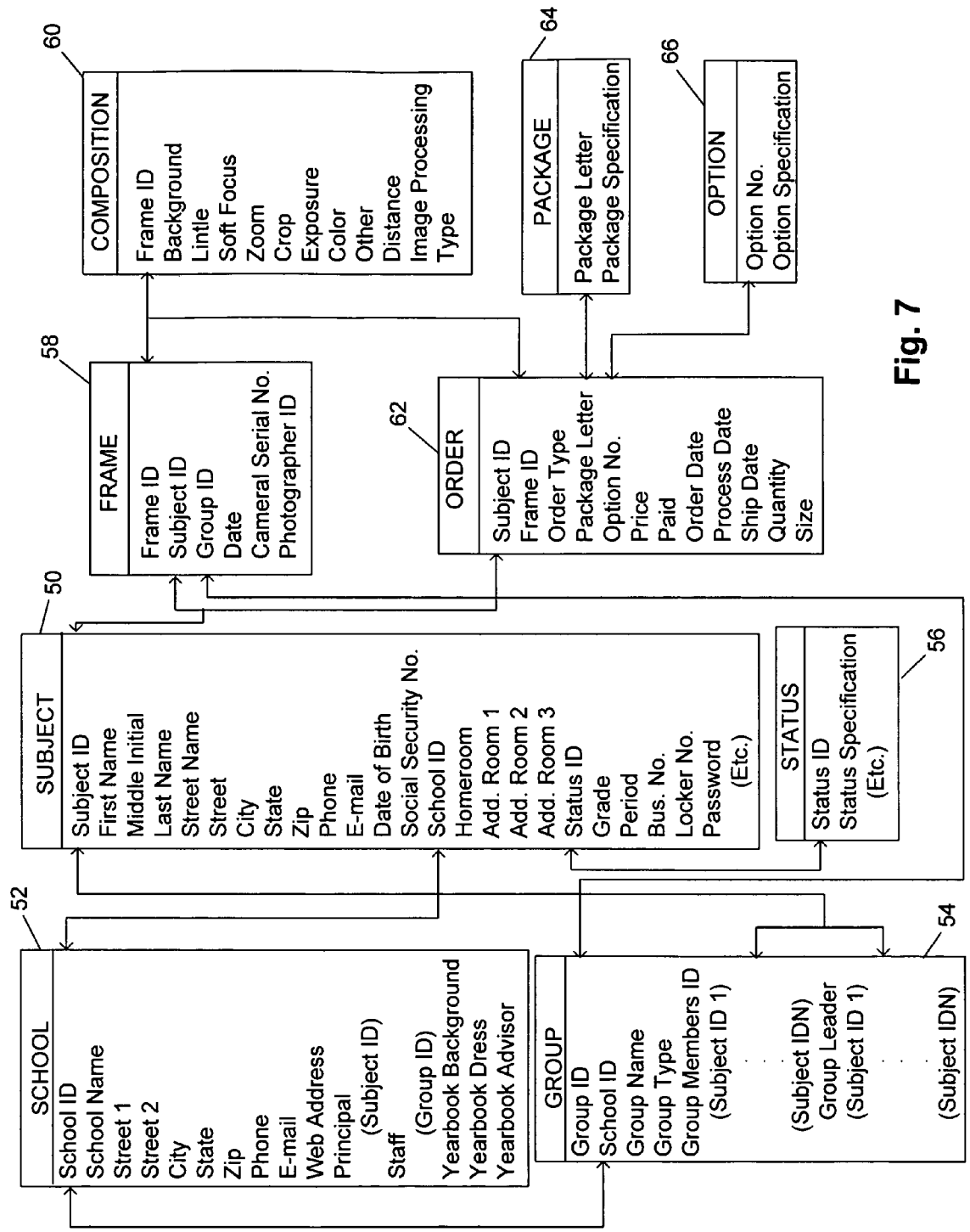
FIG. 7 is a block diagram of a data structure that can be used when a relational database is employed to practice the present invention.

As indicated above, various types of databases can be employed. FIG. 7 shows how the data might be organized in a relational database. As shown in FIG. 7, the database comprises nine tables. These include subject table 50, school table 52, group table 54, status table 56, frame table 58, composition table 60, order table 62, package table 64 and option table 66.

Subject table 50 is the table which all the data related to an individual subject is stored. The subject ID stored in this table is used to link the data in the table to the group table 54, the frame table 58, the order table 62, and vice versa. The data in the subject table 50 is also relationally linked to the school data table 52 through the school ID data field. Similarly, the subject table 50 is linked to data in the status table 56 through the status ID field.

A separate status ID is assigned for students, principals, teachers, teacher's aids, staff, coaches, etc. The drop-down menu allows the user to select the correct status for the subject from the available options listed in the status table 56.

School data, of course, falls within the realm of subject data. However, by placing school data in a separate table 52 and linking this data to the subject data in the subject table 50 using the school ID field, all of the data in the school table 52 does not need to be re-entered and stored separately for each subject. This structure not only saves time, but also storage space. School data helps identify the school, various personnel and also rules the school may have for yearbook pictures. If the school desires a consistent background or that all yearbook pictures show the student in uniform, this information can be stored in the school table 52.

Schools are divided into many different groupings. The group table 54, which is linked to the school table 52 using the school ID field, allows information related to such groups to be stored in the database. Teaching staffs, for example, are often divided into departments. Information related to staff comprising the math department, the language arts department, the social studies department, the science department, or any other staff group can be stored in the group table 54. Likewise, students are often divided (or divide themselves) into groups such as classes, teams, clubs or the like. Again, information related to such groups can be stored in the group table 54. Information that can be stored by a group in the group table 54 includes a unique group ID for each group and the school ID for the group so the group information can be linked to the correct school and the data for that school stored in the school table 52. Most importantly, the group table 54 includes group name, the subject ID of each group member and the subject ID of each group leader. The subject ID is used to link the data in the group table 54 to the data in the subject table 50 for each member of the group.

The collection of all of this data would be of little use if it were not capable of being linked to the frames which store the pictures taken. The frame table 58 includes a unique frame ID for each picture taken. When a digital camera is used, the frame ID will typically identify the location and name of the frame file. When a film camera is used, the frame ID identifies the roll of film and frame number on which the photograph is stored. When the picture saved in a frame is of a single subject, the frame table 58 includes the subject ID of the subject. This permits the frame to be linked to all of the data in the subject table 50. When the picture saved in a frame is of a group, the frame table 58 includes the group ID of the group so that the frame is linked to all the data in the group table. Other information such as the date the picture was taken can be stored in the frame table 58 as well. Editing instructions for the processing lab can be stored in table 58, but for added flexibility such data can be stored in a separate composition table 60 which is linked to the frame table 58 by the frame ID.

From a commercial standpoint, none of this would be particularly useful were it not for the ability of the system to assist in automatic processing of orders. Most information related to an order is stored in the order table 62. Orders are placed by subjects. Thus, order table 62 is linked to the subject table 50 using the subject ID. Orders are also typically frame specific. Thus, each order is linked to a frame using the frame ID. To assist in processing, various standard packages have been developed. Each package is assigned a separate letter. The package letter and the specification for each of the standard packages are stored in table 64. Likewise, several options are available for each package. A unique option number is assigned to each option. The option number and the specification for each option is stored in option table 66. The customer can select from these packages and options. The appropriate package letter and option number is stored in table 62. Again, tables 64 and 66 can be used to create drop-down menus for use in filling out customer order information.

There may also be times when a customer desires something different than what is offered in the standard packages and options. The quantity and size of prints for a special order can be reflected in order table 62. Information related to the price charged and whether payment has been received can also be stored in order table 62. Information related to date an order was placed, processed and shipped can also be included in order table 62.

Those familiar with relational database design will be able to design a user interface that permits one to use the database to quickly and efficiently enter, display, edit, or print data. This interface can be designed, for example, so that scanning of a card in the card reader 5 will cause the system to call up and display a particular set of subject data. The interface should also be designed to include logical data entry screens to enable efficient data entry using the keyboard, a mouse or other data entry tools. This is particularly important when entering order information. Finally, when photographs are stored in a digital frame, the interface should be designed so that the photographs of a subject or group can easily be recalled and displayed either by entering the appropriate subject ID or group ID.

So that data collection only minimally interferes with the actual taking of photographs, in most cases all of the data stored in the frame table is generated automatically. When a picture of an individual subject is to be taken, a card such as the one shown in FIG. 8 containing the subject ID is inserted into the card reader. The system displays the subject information for the subject and perhaps also displays a picture previously taken of the subject so the photograph can verify that the correct subject ID is being used. The photographer then takes the picture and the system generates the frame ID, associates it with the subject ID in the frame table 58, determines whether the camera was in the landscape or portrait mode, and stores all of this data as well as the data in the frame table 58.

The system works in a similar fashion when a picture of a group is taken. If group information for the group already exists in the database, the photographer merely enters the group ID and verifies that the correct group ID is entered using information automatically displayed by the system. If the information is for the correct group, the photographer takes the picture. The system then automatically adds the frame ID for the picture, the group ID for the group shown in the picture, the orientation of the camera when it took the picture and the date the picture was taken to frame table 58.

If the group to be taken is a new group to which no group ID was previously assigned, the system not only creates information for the frame table 58, but also for the group table 54. The photographer enters a command requesting the system to create a new group and then inserts the cards for each member of the group into the card reader to identify the members of the group. The subject ID for each member is stored in the group table. The algorithms used allow the system, based upon a comparison of the status ID of each subject, to automatically determine who the group leaders (i.e., teachers, coaches, or the like) are. This, of course, can be edited later if there are processing errors. Information on any subject not in possession of a card like the one shown in FIG. 8 can be added to the group table 54 and subject table 50 using the keyboard at any time. Once all the members of the group have been identified, the photographer takes the picture. The system assigns and stores the frame ID for the picture in the frame table 58 along with the group ID, the orientation and date information.

Ideally, before a photographic session begins, most if not all of the data in the subject, school, group, status, package and option tables will already be in the database. Information in the frame table is automatically generated as photographs are taken. Data in the order and composition tables can be added during the session or later. Data in any of the tables can be edited at any time.

While FIG. 7 shows a relational database structure, other database structures can be used. The use of a relational database offers the advantage of avoiding the need to store significant amounts of redundant data. Also, the database structure shown in FIG. 7 is intended to be exemplary rather than limiting. The organization of data, tables, relationships and the like can be modified. Also, additional data can be added to what is shown or some of the data that is shown eliminated without deviating from the invention.

From the foregoing, certain advantages to the arrangement shown in FIG. 5 should be apparent. The structure shown in FIG. 5 suggests that the database can reside either on the computer 2' or a server 8. The advantage of having the database reside in the computer 2' is that no high speed data connection must exist between the camera system and the lab. However, where such connections are available (and they are now available in many if not most schools), there are benefits of having the database and frames stored on a central server 8 such that the camera system operates as a client in a client/server network. In this environment, multiple camera systems can share data and frames. Multiple photographers can all work effectively at a single school site either at the same time or at different times and not have to worry about synchronizing data because this would be done automatically on the server 8.

The client/server model also offers advantages of a commercial enterprise maintains a number of different locations where studio portraits can be taken and prints of the photographs purchased. The customer need not return to the same store where the photographs are taken to order prints because all stores would have access to the database and frames. The customer could even choose to order prints of photographs taken at different locations.

When a client/server model is used, a store or even a portable studio can be set up with multiple stations, some used to take pictures, others used to enter or edit data, and still others used to take orders. This can greatly increase the efficiency of personnel and enhance the experience for customers.

Still another advantage of a client/server model is that the customer, by using the subject ID and password stored in the subject table, can view digital frames and place orders from any computer having access to the Internet. The system can be set up to be user friendly and to ensure proper security such that access is limited to frames containing pictures of the subject to a group to which the subject belongs. The system could also be used to allow a customer have the lab process and print pictures taken by the customer using a digital camera. The customer would simply need to attach the picture files from his or her digital camera to a message containing the subject ID and send this message to the lab. The system automatically generates a frame ID for each such picture and automatically stores the frame ID, subject ID and date in the frame table 52. Order information also received over the Internet is automatically stored in table 62. Orders, when complete, are shipped to the address for the subject stored in the subject table 50, the accuracy of which can be verified by the customer. Payment information can also be stored in the order table 62.

As mentioned above, FIG. 8 shows a card 100 that can be printed from the database using the printer 7 shown in FIG. 1. The card 100 should ideally include the first name 101 and last name 102 of a subject to be printed. The card also can include other identification information such as the subject's grade 103 and the number 104 of the student's teacher. The card also includes a unique identification number 105 for the student represented not only alphanumerically, but also in a machine readable format such as bar code 106. Other machine readable formats can be used without deviating from the invention. Separate cards 100 can be printed and distributed to each student in the class.

The cards 100 are not only used to reflect information already in the database, but can also be used to supply other information which can be added to the database such as the student's homeroom number, the class period the student has the teacher, the student's student identification number, the student's locker number, the student's date of birth, the student's bus number, etc. The card 100 can also be used to identify the products (packages) the subject wishes to purchase. In the example shown, the customer can use the card 100 to select between any of ten different packages each having five different options. The additional data conveyed on these cards can be entered into the database at a point in time.

The cards 100 are not only used to verify data in the database and enter new data, but are also used in matching data in the database to photographs that are taken. As mentioned above, the card 100 can be inserted into the card reader 5 before the subject is photographed. The card reader 5 reads the machine readable code 106 to quickly tell the system the identity of the subject being photographed. This is far more efficient than using the keyboard 4 which can also be used to supply correct identification information for the subject to be photographed and is highly advantageous when taking numerous photographs of different subjects or when taking a photograph of a large number of subjects. With the subject or subjects of a photograph properly identified using the unique identification number for the subject embedded in the bar code 106, the system can quickly and effectively link a frame to the subject or subjects shown in the image captured in the frame.

As suggested above, the system of the present invention offers two distinct advantages over that discussed in the Hopson patent. First, the data can be edited any time. Second, the data can be supplemented at any time. These two advantages arise from the fact that the bulk of the data in the database is stored on a media that permits editing rather than on film.

The ability to edit data makes it, for the first time, practical to use the modes of operation shown in FIGS. 9-12, 14 and 15. When one is unable to edit the data, steps must be taken to force the entry of data prior to the time each photograph is taken as suggested in FIG. 13. The ability to edit the data allows one to correct errors and even re-link the frames.

Figure 8:
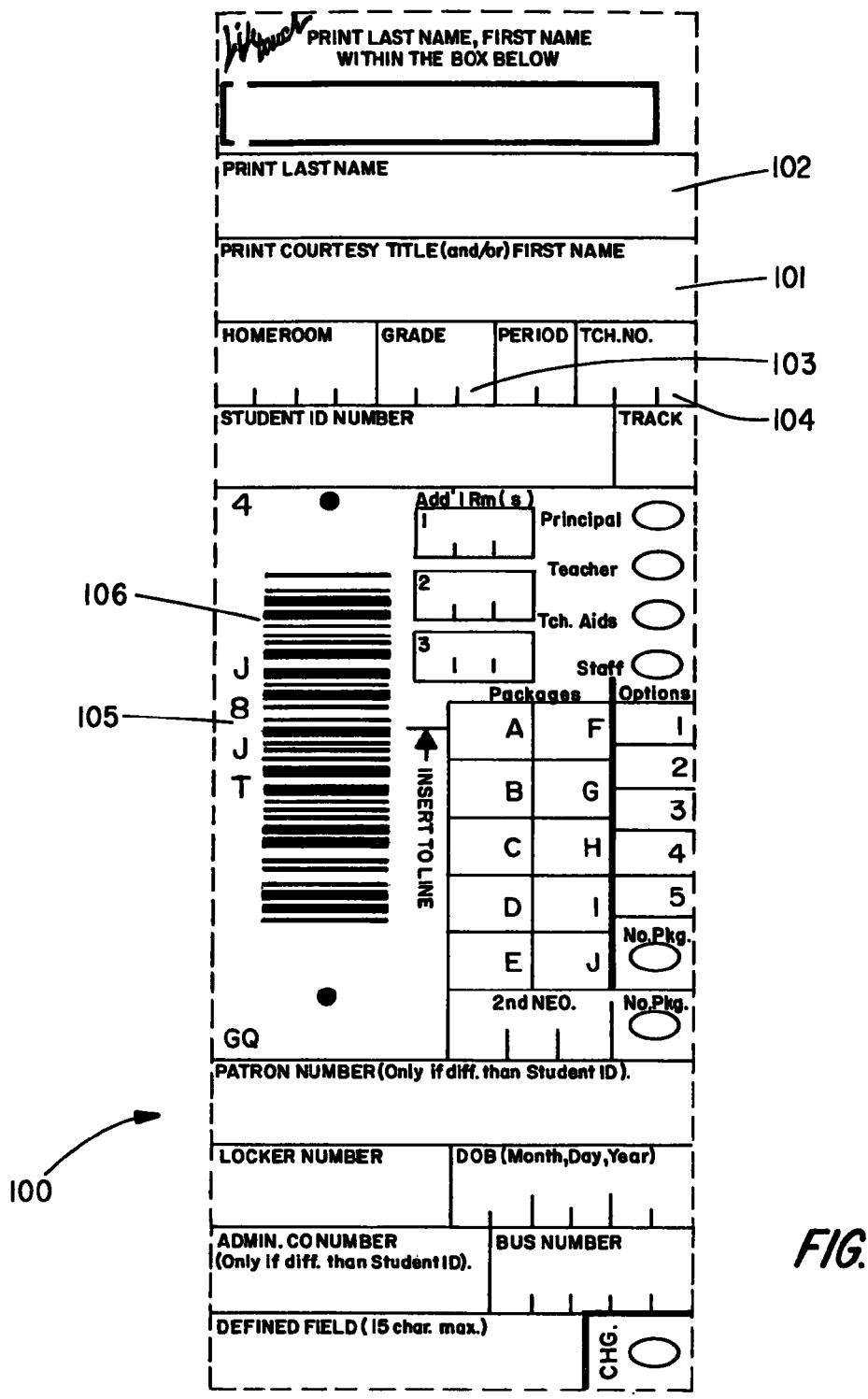
FIG. 8 is a sample data card that can be used in conjunction with the present invention.

The ability to add data after the photography session is complete is also highly beneficial. For example, if the cards of the type shown in FIG. 8 are used, a photographer need not key in new data written on the card before the picture is taken. Instead, the photographer can use the cards to associate the subject with the frame as discussed above. Later, after the photo session is complete, the photographer can again insert into the card reader 5 any cards 100 to which information has been added to call up the data for the particular subject. The new or edited information on the card can then be entered by the photographer using the keyboard 4 to modify the data in the database for the particular subject. For example, the photographer can use this method to indicate the package ordered by the subject and whether payment has been received for the package.

Even greater advantages can be derived from the invention when the images are stored digitally. Frames can be printed or displayed. The photographers can edit the frames themselves to improve the quality of the image. Alternatively, the photographer can provide editing instructions to the lab in the form of composition data. Such editing can include substituting backgrounds, softening the focus, adding vignettes, cropping the image, zooming in or zooming out, or the like.

When digital photography is used, the photographer can also display or print the images so that the customer can choose between several images, rank the images, decide which of several images to use in a yearbook, or create a unique package from the images to be purchased by the customer. The database can be supplemented to include such order information and the lab can then use this order information for processing.

As indicated above, the database can be stored on a server 8 in a processing lab to create a client/server relationship between the lab and the computers 2 or 2'. When this arrangement is used, the system has even greater flexibility. Photographs of the same subject can be taken at different times, at different sites and by different photographers. Since the frames for these photographs are all linked together using the subject's unique identification code, all of the frames for the subject can be downloaded to a particular computers 2 or 2' and displayed for ranking, selection and ordering. Also, if the subject's unique identification code, data and frames are maintained over a period of years, new products containing photographs taken over time can quickly and easily be created using the various image files and the database. For example, a customer could order a collage of the annual school pictures taken of their child from kindergarten through the senior year of high school. Thus, many other specialty products become available for the first time because of the robust nature of the data system of the present invention.

Given the robust nature of the present invention, various prints can be easily and efficiently created using the frames and associated subject data. The system of the present invention allows random pictures to be combined into groups through the use of the subject data. For example, school pictures of students can be organized in an infinite number of groupings. They can be arranged alphabetically. They can be grouped by class assignment. They can be grouped by bus assignment. They can be grouped by locker assignment. They can be grouped based upon honors earned (honor roll, National Honor Society, team captains, class officers, all-conference, etc.). Once grouped, the system can create attractive prints of the grouping which can be used in any number of ways.

Prints created using a printer attached to the system are just one type of output the system is capable of generating. Individual pictures, group pictures or groups of pictures can be output to one or more displays. Such items can also be output to and recorded electronically on a CD-Rom or any other type of storage media. Other such storage devices include, but are not limited, to solid state memory devices such as flash memory cards, memory sticks, and smart media cards. Such items can also be output to other computers or electronic devices via a local area network, the Internet or any other type of connection.

FIGS. 9-15 are flow charts describing several different modes that can be employed by either a digital or film camera system for creating and maintaining the match or link between the data and the frames.

Figure 9:
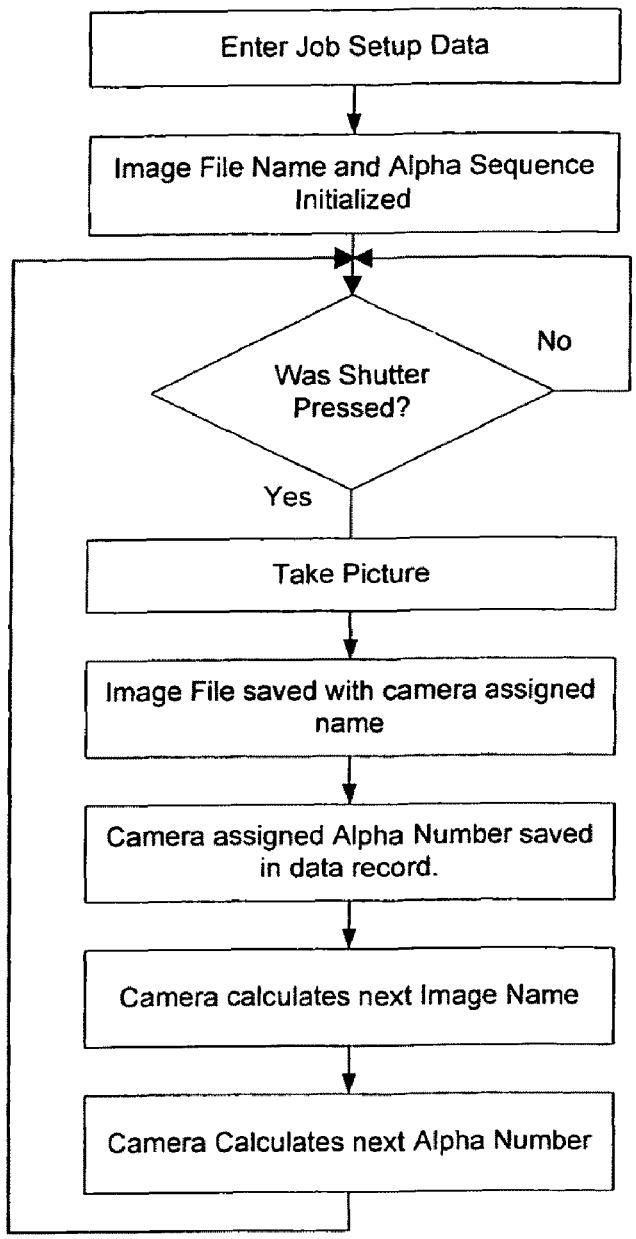
FIG. 9 is a flow chart showing one mode in which the combination camera and computer of FIGS. 3 and 4 can be used.

The mode shown in FIG. 9 can effectively be used when large numbers of pictures must be taken during a very short period of time and the photographer is not at liberty to interrupt or interfere with the event at which the photographs are being taken. This mode is useful, for example, when taking photographs at a graduation ceremony. It permits the photographer to take the picture of each graduate as he or she received a diploma without interfering with the ceremony.

The mode shown in FIG. 9 creates an automatic image/data match. More specifically, the camera generates a sequential code for each frame. This mode is particularly well suited when performing digital rather than film photography. Once the picture taking is complete, the frames can be viewed on the display 6 using the code or can be printed out on the printer 7 to permit immediate proofing of the picture. Product order information related to the frames can then be entered and associated with the code for the specific frames.

Figure 10:
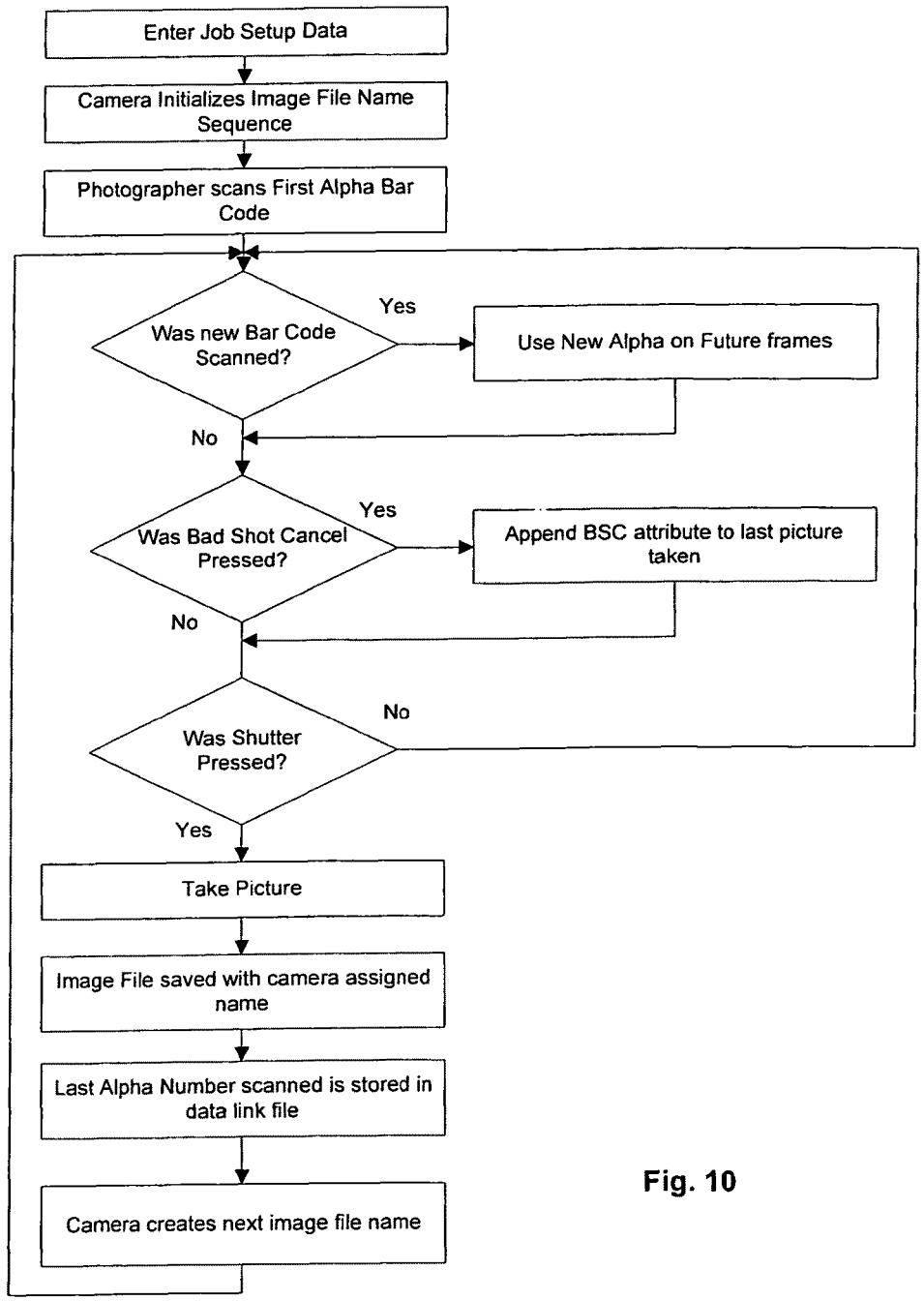
FIG. 10 is a flow chart showing a second mode of operation of said combination camera and computers.

The mode shown in FIG. 10 is well suited for situations where there is an opportunity to enter data before a new subject is photographed, but there may be a need to take multiple photographs of the same subject. The mode shown in FIG. 10 is well suited for photography of pre-school aged children who have a short attention span and do not always cooperate with the photographer. The photographer may need to take a number of photographs to capture an image of the child which will be pleasing to the parents.

When the mode of FIG. 10 is used, the photographer begins the process of photographing the subject by calling up or entering identification data for the subject. This preferably is done using the bar code reader 5 but can also be done using the keyboard 4. The camera will continue to use this data for this subject for each picture taken until the photographer repeats this step for a new subject. When a picture is taken, the image is saved to a frame (either on the film or in a digital file) with a name assigned to the frame and is linked to identification data entered for the subject. This process will be repeated with each picture taken until data for a new subject is entered.

The method shown in FIG. 10 has several risks, but also several advantages which make it particularly useful for pre-school photography. It is possible that a photographer will forget to enter data for a new subject and therefore capture images for two different subjects using one subject's identification data. When operating in this mode, the camera cannot generate an error message if this should occur. The database, however, is sufficiently robust that, upon discovery of such an error, the photographer can later enter or call up the identification information for the second subject and edit the link to relink the frames to the correct subjects. An important advantage of this mode is that the camera 1 is never locked and photography is paced only by the recharge time of the lights used to illuminate the subject. Thus, the subject can be repeatedly photographed without interruption until a good image of the subject is captured in a frame.

Figure 11:
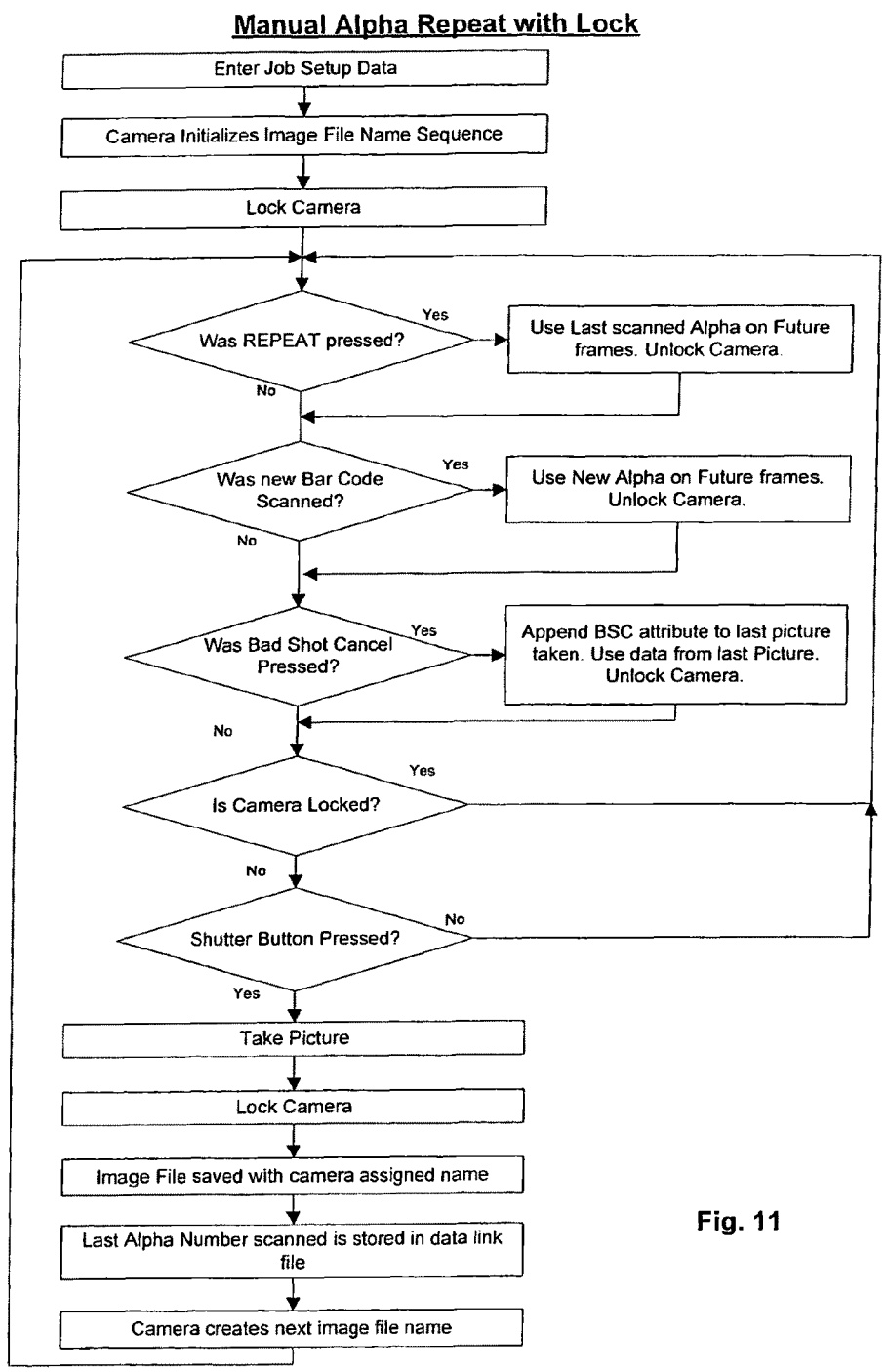
FIG. 11 is a flow chart showing a third mode of operation.

Another mode of operation is shown in FIG. 11. This mode of operation is well suited for situations where only a single photograph will be needed of each subject of a large number of subjects. This method is well suited for taking pictures of underclassmen for a yearbook or posed pictures of couples at a dance.

When the method of FIG. 11 is employed, identification information for a subject is entered or called up by scanning a bar code, or using the keyboard. A picture is taken. The shutter to the camera is then locked until either the photographer enters a repeat command or a bad shot cancel command. In either of these cases, the same identification information will be used for the next photograph unless new subject information is entered or retrieved. The method shown in FIG. 11 ensures a higher level of data integrity. The trade-off is that an extra step is required to take a second picture of a subject thereby increasing the time between pictures. This trade-off, which may not be acceptable when photographing preschoolers, is generally acceptable when photographing more mature subjects.

Figure 12:
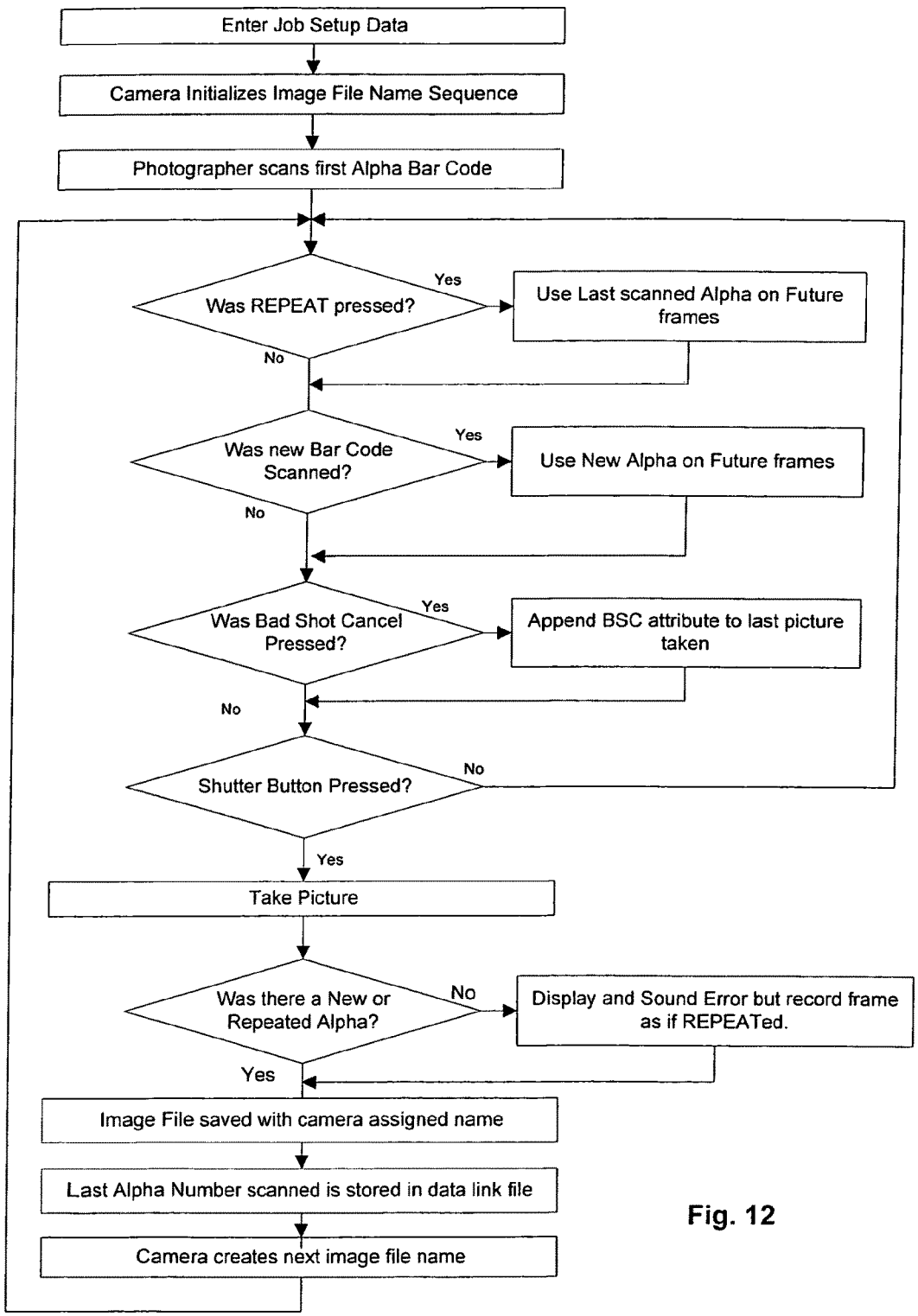
FIG. 12 is a flow chart showing a fourth mode of operation.

The mode shown in FIG. 12 is very similar to the method shown in FIG. 11. The only real difference is that, instead of locking the shutter, audible and visual error signals are generated.

Each of the modes discussed above permit either editing or adding data at virtually any later point of time to the database. The system permits the edited or added data to be associated with a particular frame. There may be times, however, when it is desirable to ensure a certain set of required data be entered before any photograph is taken. When this is the case, the mode of operation shown in FIG. 13 is advantageous.

Figure 13:
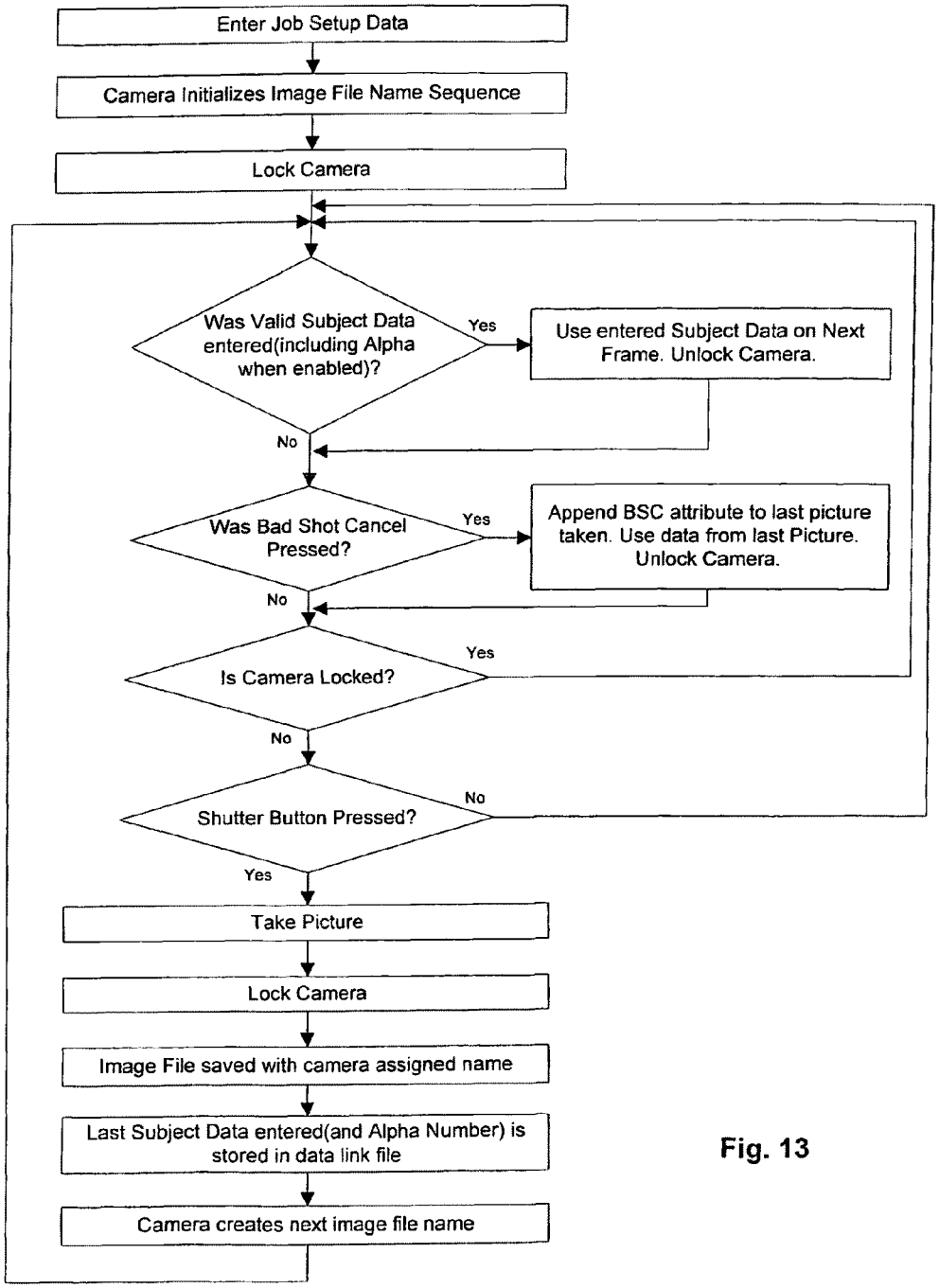
FIG. 13 is a flow chart showing a fifth mode of operation.

When the mode of FIG. 13 is used, required data is established during a camera set up process. Data entry is strictly enforced for each picture by locking the shutter until all required data is entered. Only after all the required data is entered will the computer unlock the shutter. Once the picture is taken, the shutter is again locked until the photographer either (a) enters a bad shot cancel command (in which case the previous picture will be deleted and the data for that picture will be linked to the next picture); or (b) enters all the required data for the next picture.

In still other situations, a photographer may want to take multiple pictures of the same subject, but link different data to different pictures of the subject. This is advantageous, for example, when a photographer is taking senior portraits of high school graduates. This mode is shown in FIG. 14.

Figure 14:
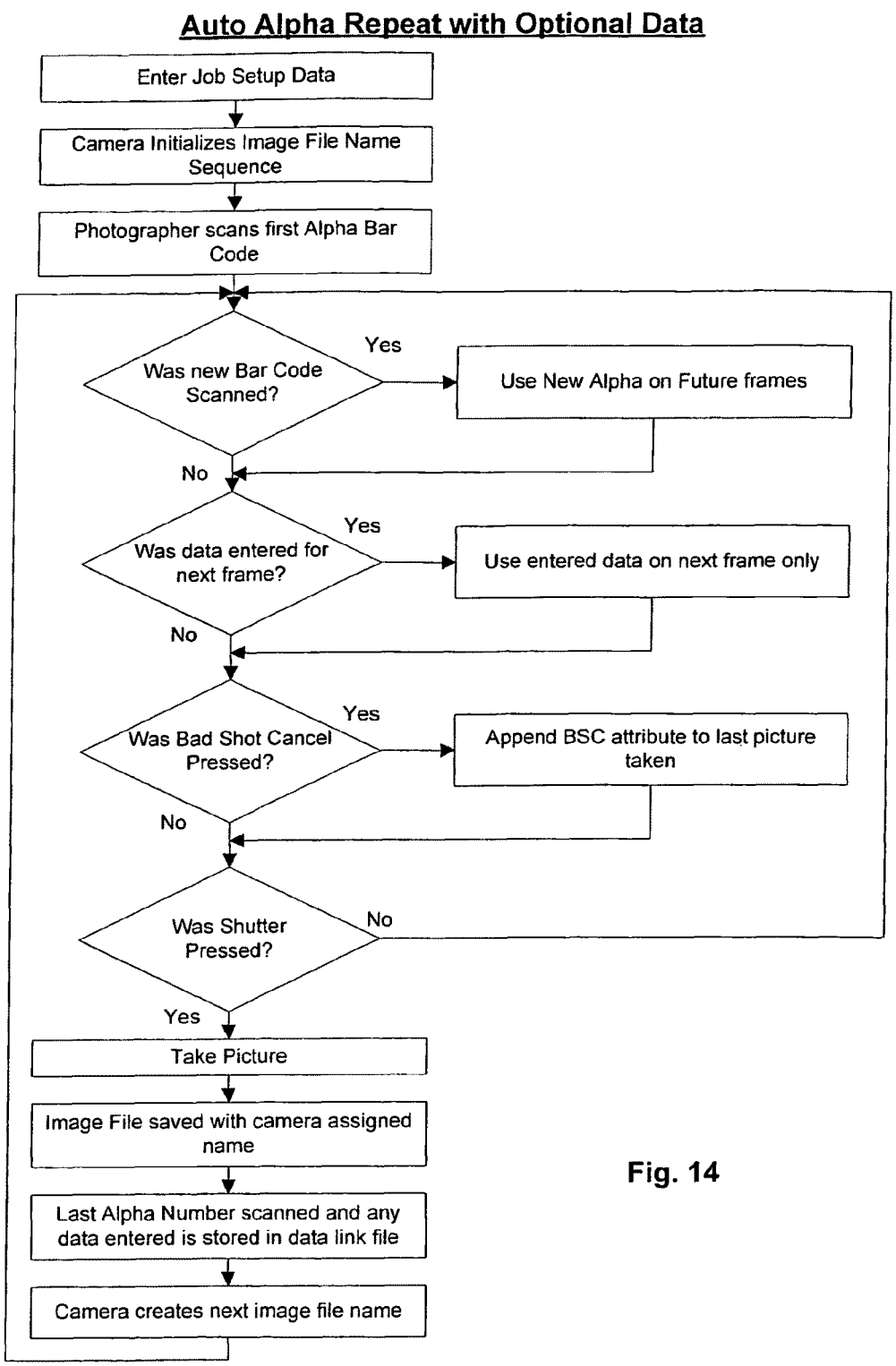
FIG. 14 is a flow chart showing a sixth mode of operation.

The mode shown in FIG. 14 allows some data to be entered at the beginning of the photo session which is associated with each of the photos taken, yet allows additional, optional data to be added and linked to the different photographs taken during the session. The linking of such optional data may be desirable to indicate which photographs, given the background used or the attire worn by the subject, would be acceptable for inclusion in the school's yearbook given the editorial restrictions for the yearbook established by the school. For example if a military school has a rule requiring students to be in uniform in their yearbook pictures, and the subject is photographed both in uniform and in other clothing, data can be entered to indicate which photos are acceptable for use in the yearbook so that only the acceptable photos are automatically sent to the yearbook editor for consideration.

Figure 15:
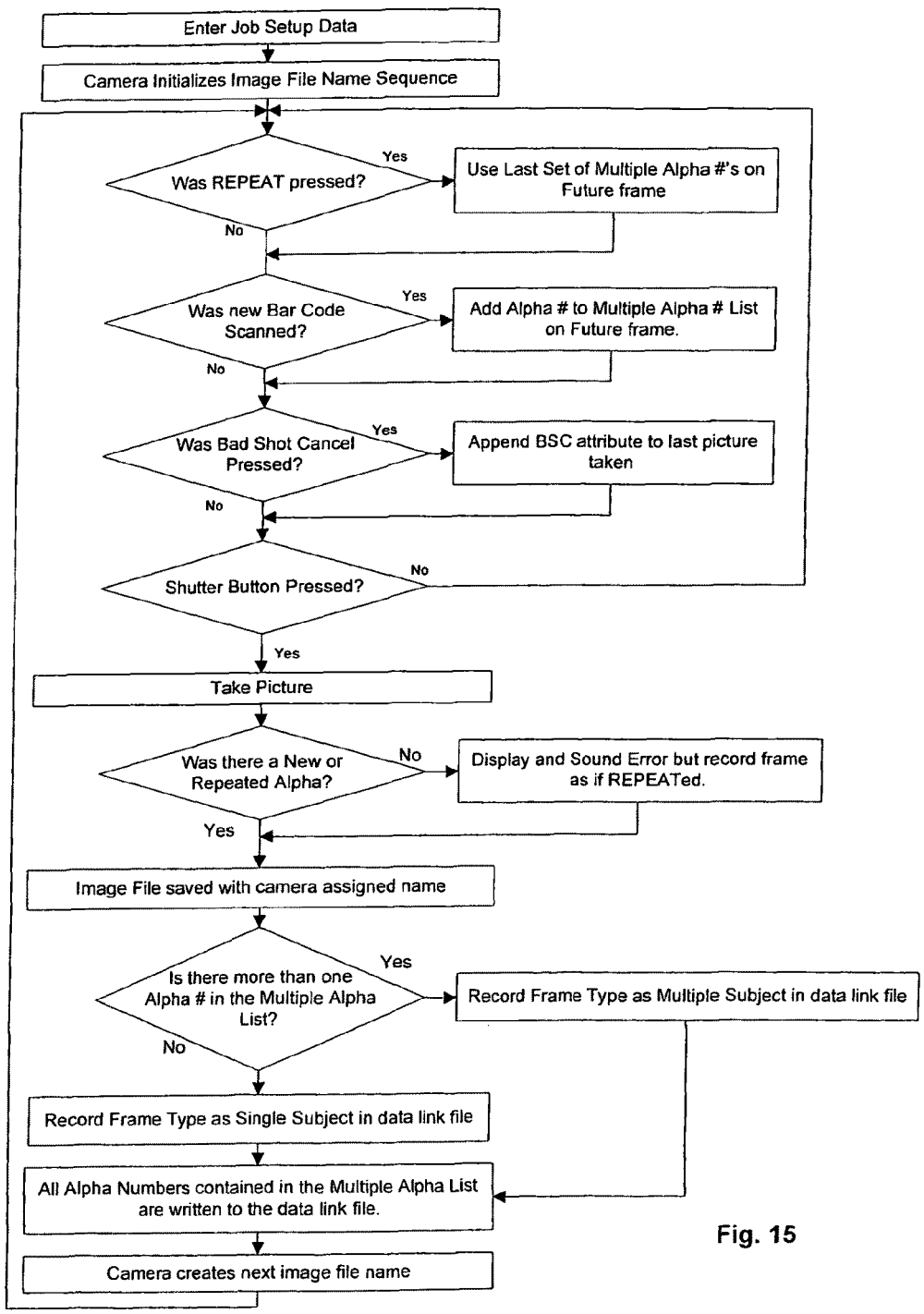
FIG. 15 is a flow chart showing a seventh mode of operation.

Still another mode, shown in FIG. 15, is useful when taking team or group photographs. Information enabling the photograph to be linked to each group member is entered before the group photograph is taken. This can be done by scanning the card (see FIG. 8) for each team member before the picture is taken. Individual members of the group may also have individual pictures taken. Because both the group picture and the individual picture are linked to the particular subject, an order by the subject that includes one or more prints of both the group picture and the individual picture can be easily and automatically processed.

A single camera can be operated in any of the modes discussed above. The photographer can select between these modes based upon the need data collection and the timing demands of the photographic session. Irrespective of the mode or type of camera (film or digital) used to take the pictures and associate the frames with the data, the advantages of the present invention can be achieved.

Figure 16:
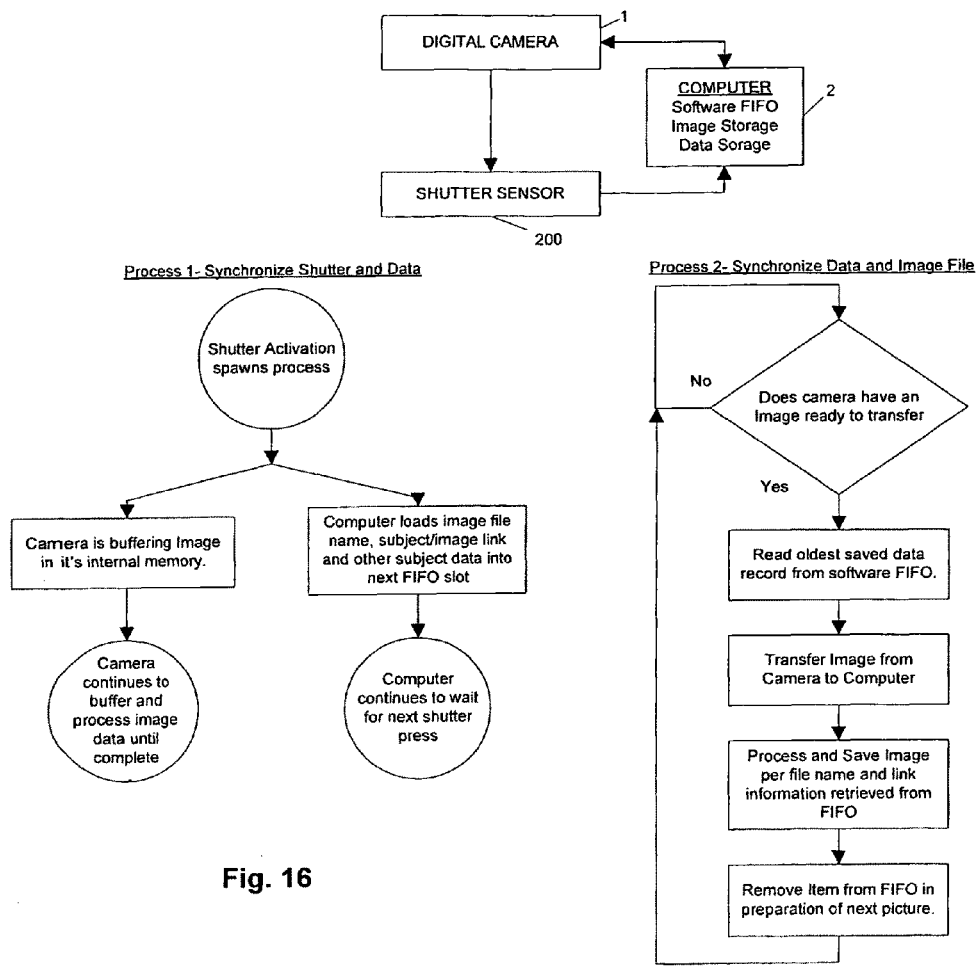
FIG. 16 is a diagram showing how an image/data link is created.

When the camera 1 is used in any of the modes shown in FIGS. 9-15, creation of a link or match between the frame and the data is essential. One problem that can exist when a digital camera is used is that pictures are taken and digital representation of the image is buffered into the camera's memory at a faster rate than the image can be returned by the computer. To ensure a proper link between the digital representation of the image and data in the database, this problem must be addressed. FIG. 16 shows how this can be accomplished when a digital camera is employed. As shown, a shutter sensor 200 is coupled to the camera 1 and the computer 2. When this sensor 200 detects a shutter activation, the camera buffers a digital representation of the photographic image into its internal memory and continues to buffer and process the image data until capture of the image in a digital form is complete. This process is repeated with each successive picture. Upon detection of each shutter activation (i.e., each time the digital camera begins the process of capturing an image as a digital representation), the computer assigns a subject/link code and image file name which will be associated with the digital representation of the photographic image (i.e., frame) when the computer retrieves it from the camera. The image file name and subject/image link data 45 are then loaded into the first available first-in/first-out (FIFO) slot of the computer's memory. This process is then repeated for each shutter activation detected by sensor 200. Periodically, the system determines whether the camera 1 has an image ready to transfer to the computer. When an image is ready for transfer, (a) the computer reads the oldest saved image file name and subject/image link 45 in the FIFO slots of the memory; (b) transfers the oldest image still in the camera 1 from the camera 1 to the computer 2; (c) the computer 2 processes and stores the image per the file name and link 45 and the file name retrieved from the FIFO slots of memory are stored in the database; and (d) deletes the file name and link 45 just used from the FIFO memory slots. This process is repeated for each image recorded by the camera 1.

The present invention is intended for use in a highly automated environment where thousands of photographers in a whole host of locations and situations take millions of pictures of millions of subjects. The foregoing description of a preferred embodiment is sufficient to enable one of ordinary skill to practice the invention. Changes, of course, can be made without deviating from the invention. The scope of the invention is only limited by the following claims.

What is claimed is:

1. A photography system comprising:
    a camera that captures at least one digital image of one or more subjects, the at least one digital image being associated with an image identification code;
    a user input device that receives data including a subject identification code and other data;
    a storage device that stores a relational database, the relational database including a plurality of tables, the plurality of tables being respectively associated with a plurality of different data groups; and
    a processor that stores the image identification code, the subject identification code, and the other data within the plurality of tables of the relational database to link the at least one digital image with the other data, to relationally link the subject identification code to the other data, and to organize the other data according to the plurality of different data groups.

2. The photography system of claim 1 wherein the user input device is a card reader.

3. The photography system of claim 1 wherein the user input device is a bar code scanner.

4. The photography system of claim 1 wherein the user input device is a keyboard.

5. The photography system of claim 1 wherein the user input device is connected via a port.

6. The photography system of claim 1 wherein the user input device is connected via a wireless connection.

7. The photography system of claim 1 wherein the user input device is a computer having a user interface.

8. The photography system of claim 1 wherein the processor stores the image identification code, the subject identification code, and the other data before the at least one digital image is captured and wherein the processor further links the at least one digital image with the other data after the at least one digital image is captured.

9. The photography system of claim 1 wherein the processor stores the subject identification code and the other data after the at least one digital image is captured.

10. The photography system of claim 1 wherein the storage device is a hard drive.

11. The photography system of claim 1 wherein the storage device is a flash memory card, a memory stick or a smart memory card.

12. The photography system of claim 1 wherein the camera has a camera body and the storage device is located within the camera body.

13. The photography system of claim 1 wherein the camera has a camera body and the storage device is located outside of the camera body.

14. The photography system of claim 13 wherein the camera further includes a port used to transfer the at least one digital image outside of the camera body for storage on the storage device.

15. The photography system of claim 14 wherein the port is an RS232 port, a USB port or a fire wire port.

16. The photography system of claim 13 further including a wireless device, wherein the wireless device is used to transfer the at least one digital image outside of the camera body for storage on the storage device.

17. The photography system of claim 1 further including an output device configured to output the at least one digital image together with the other data linked to the image.

18. The photography system of claim 1 wherein the relational database provides for editing of data stored on the storage device.

19. The photography system of claim 1 wherein the relational database provides for supplementing of data stored on the storage device.

20. The photography system of claim 1 wherein at least some of the plurality of tables in the relational database include a subject table for each of the one or more subjects, the subject table including the subject identification code and personal information from the other data, the subject table linking the subject identification code to the at least one digital image.

21. The photography system of claim 20 wherein at least some of the plurality of tables in the relational database further include a second table for a second data group, said second table including information from the other data related to the second data group, said second table linking the other data related to the second data group with the at least one digital image.

22. The photography system of claim 21 wherein at least some of the plurality of tables in the relational database further include a group table including information from the other data related to a group the group table linking the information from the other data related to the group with the at least one digital image.

* * * * *